Oct. 28, 1958  R. Z. HAGUE ET AL  2,857,763
FLUID METERS
Filed March 14, 1952  4 Sheets-Sheet 3

INVENTORS
ROBERT Z. HAGUE
HENNING KARLBY
ERNEST H. TREFF
BY Strauch, Nolan & Diggins
ATTORNEYS Oct. 28, 1958  R. Z. HAGUE ET AL  2,857,763
FLUID METERS
Filed March 14, 1952  4 Sheets-Sheet 4

INVENTORS
ROBERT Z. HAGUE
HENNING KARLBY
ERNEST H. TREFF
BY Strauch, Nolan & Diggins
ATTORNEYS

United States Patent Office 2,857,763
Patented Oct. 28, 1958

2,857,763

FLUID METERS

Robert Z. Hague, Oradell, N. J., Henning Karlby, Pittsburgh, Pa., and Ernest H. Treff, Long Island City, N. Y., assignors to Rockwell Manufacturing Company, Pittsburgh, Pa., a corporation of Pennsylvania Application March 14, 1952, Serial No. 276,651

24 Claims. (Cl. 73—257)

The present invention relates to fluid meters and more particularly to improvements in such meters which produce greater reliability in operation, and economy of manufacture.

In prior art meters of this type, of which that disclosed in United States Letters Patent No. 2,406,877 issued September 3, 1946 to A. R. Whittaker is typical, it has been customary to maintain the necessary accurate alignment between the fluid flow metering device and the fluid flow registering device by accurately aligning both devices relative to the meter casing. Such a method of alignment of these two devices requires extremely accurate machining of many surfaces within the meter casing and thus results in high manufacturing costs.

It is accordingly a primary object of this invention to overcome these disadvantages of the prior art by providing a meter of novel and improved construction in which the two essential components of a fluid meter, the measuring device and the registering device, are accurately aligned relative to each other independently of the structure of the meter casing which merely functions to protect these two devices against damage and to direct fluid flow through the fluid measuring device.

More specifically, it is an object of this invention to provide a fluid meter consisting of a fluid measuring device and a fluid flow registering device each having thereon one of a pair of coacting piloting surfaces for maintaining proper relative alignment therebetween, a meter casing surrounding the fluid flow measuring device and having passages formed therein for directing fluid flow through the fluid flow measuring device, and fluid seals effective to prevent flow of fluid through the casing along channels other than through the measuring device without radially restraining at least one of said devices.

A further disadvantage of prior art meter construction in which the alignment of the measuring device and the registering device is maintained by the meter housing or casing lies in the fact that the radial restraint that must be placed upon the measuring device restricts the material for the measuring device casing to metal. In measuring devices of the oscillating piston type, the piston is generally formed of hard rubber so that the piston will be light in weight, quiet in operation, and highly corrosion resistant. It has not been possible to take advantage of the lower cost and high corrosion resistance of hard rubber in forming the measuring chamber in the prior art meters, because expansion of the measuring chamber against the rigid restraint of the meter casing produced deformation or breakage.

It is therefore an important object of this invention to provide a fluid meter of such construction that the flow measuring device is mounted within the meter housing or casing in sealed relation without restraint upon expansion or contraction so that the measuring chamber may also be made of hard rubber with resultant lower cost, improved corrosion resistance and saving of critical material.

In fluid meters of this type one of the more difficult problems of design is the effective prevention of the passage of fluid from the fluid chamber surrounding the measuring device into the registering device along the element coupling them together. One of the most practical solutions to this problem yet devised is the utilization of magnetic coupling through a wall of non-magnetic material so that the registering device can be formed in a sealed unit into which fluid cannot penetrate. A coupling arrangement of this general type is disclosed in United States Letters Patent No. 2,487,783 issued November 15, 1949 to C. P. Bergman. Such meters are, however, at times, subjected to abnormal operating conditions which result in malfunctioning of magnetic coupling arrangements such as that disclosed in the Bergman patent. One such extreme operating condition is the subjection of the meter assembly to an extremely strong steady or alternating magnetic field which in the Bergman magnetic drive at times results in failure of the magnetic coupling. In order to avoid this difficulty, magnetic shields have been provided in certain forms of the prior art meters having magnetic drive couplings between the measuring device and register. One of such meters is disclosed in Patent No. 2,566,220 issued August 28, 1951 to A. B. Lindley et al. for Water Meter. The prior art shields with which we are acquainted have not proved to be entirely satisfactory in that they have not been effective against all frequency ranges of alternating magnetic fields to which a meter may be subjected and in that they have been effective only against magnetic fields having a particular orientation relative to the meter structure. It is accordingly an object of this invention to provide an improved fluid meter embodying a magnetic drive which is magnetically shielded against both steady and alternating magnetic disturbances irrespective of the orientation of such disturbance relative to the drive.

More specifically, it is an object of our invention to provide an improved fluid meter embodying a magnetic drive comprising a pair of magnetically coupled members guided for conjoint movement about a common axis, and having a magnetostatic shield defining a low reluctance magnetic flux path and preferably a magneto-dynamic shield about the path of movement of the members.

A second abnormal operating condition to which meters of the magnetic drive type may be subjected is the high acceleration of fluid flow through the measuring chamber. This requires a corresponding acceleration of the moving parts of the registering mechanism and results, at times, in separation of the driving and driven magnets.

In a magnetic drive of the type disclosed in said Bergman patent, sufficient friction and inertia exist in the register and driving parts so that once the driving and driven magnets become separated the driving magnet will only pick up the driven magnet at extremely low rates of relative velocity at the time the driving magnet comes adjacent the driven magnet. The cause of this difficulty will be best understood by visualizing a theoretic drive arrangement in which a vertical shaft journalled for rotation upon frictionless bearings, upon which a bar magnet is fixed as a crank, is driven by a magnet mounted for movement in a circular path about the axis thereof. In such a theoretic drive system, as the driving magnet approaches the driven magnet, the magnetic force of attraction between the two magnets will impart an impulse tending to cause the driven magnet to move about its shaft in a direction opposite to the direction of movement of the driving magnet. After the driving magnet passes the driven magnet, an opposite impulse is imparted to the driven magnet. Since the two impulses are equal and opposite the driven magnet will not follow the driving magnet. Therefore when the driving and driven magnets have been separated and the driven magnet has come to rest, movement of the driving magnet merely produces oscillation of the driven magnet. The drive coupling therefore cannot be re-established unless the driving magnet is brought substantially to rest in position to pick up the driven magnet, and the drive is gradually accelerated. For these reasons a theoretic magnetic drive is impractical in a meter mechanism.

In the drive of said Bergman Patent 2,487,783, the best of the prior magnetic meter drives, friction on the driven magnet was minimized to the point where the effects of the negative impulses after rupture of the driving connection were not adequately suppressed. In our improved meters, the friction and inertia in the drive between the measuring device and the registering device, and in the register mechanism are such that a pick up of the driven magnet by the driving magnet can occur at substantially greater than normal operating rates of passing velocity.

It is, therefore, an important object of this invention to provide an improved fluid meter including a magnetic drive in which the drive connection is maintained at all times under practical operating conditions.

It is a more specific object of this invention to provide a novel combination of fluid flow measuring device with a fluid flow registering device of the type consisting of magnetically coupled driving and driven members of improved construction in which inertia effects are minimized and frictional effects are used to suppress the effects of negative impulses in a way to establish and maintain reliability of drive in operation. This we accomplish by providing drive parts of minimum size and weight to minimize driving friction and inertia, and a magnetic coupling comprising a pair of magnetically attracted members, one of the members being mounted for movement in a path normal to the axis and the other of said members being guided for movement in a path within the path of said one member by a means permitting limited free axial movement thereof so that, if the members are separated for any reason during operation, the driven member automatically moves into engagement with a braking surface, whereby movement of the driven magnet toward the driving magnet, as the latter approaches the former, is suppressed.

A further general object of this invention is to provide a fluid meter of improved construction which is compact in form, resulting in substantial savings of materials and space, and reduction in weight.

In accordance with this general object, it is a more specific object of this invention to provide a fluid meter having an oscillating piston type flow measuring device and a flow registering device operatively coupled by a pair of magnetically coupled members in which the driving member of the pair is fixed centrally of a bottom web of the oscillating piston of the measuring device so that the paths of movement of the pair of members lie within the confines of the cylindrical measuring chamber of the measuring device.

A further specific object of this invention is to provide a fluid meter in which the meter housing is formed internally with recesses defining fluid chambers and passages around the measuring device and the registering device for guiding the fluid through the measuring device so that a meter of minimum overall size, relatively light weight, and utilizing a minimum amount of material in the housing thereof is produced.

A further object of this invention is to provide a fluid meter which is compact in construction consisting of a fluid flow measuring device and a registering device operatively coupled and adjacently mounted within a housing having fluid passages and chambers formed therein around said devices for directing fluid flow through the measuring device.

These and other objects of this invention will become apparent as the detailed description thereof proceeds with reference to the accompanying drawings wherein:

Figure 6A is a sectional view of the magnetic drive taken along the line 6A—6A of Figure 6;

*General arrangement*

Figure 2:
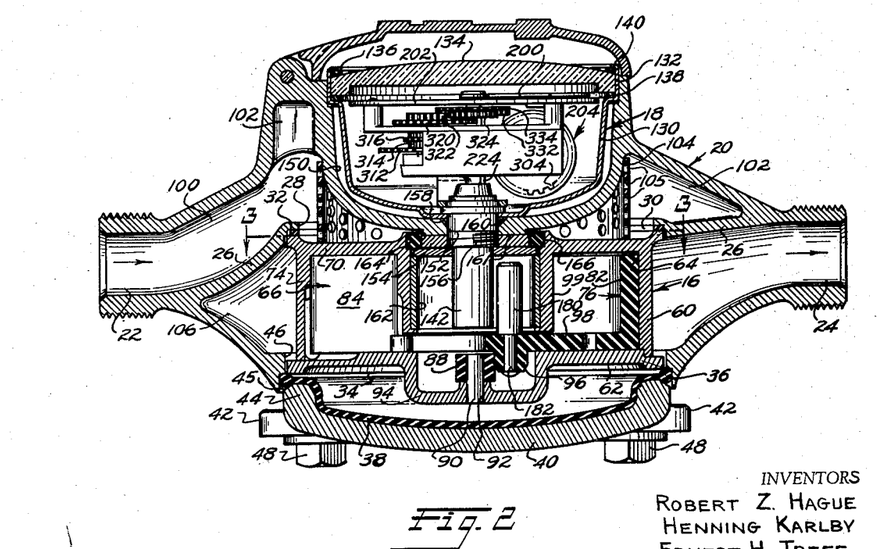
Figure 2 is the vertical section through the meter assembly taken substantially along the line 2—2 of Figure 1.

As is best shown in Figure 2, the fluid flow meter of the present invention comprises a fluid flow measuring device 16 of the oscillating piston type, a sealed register mechanism assembly 18, and a meter housing 20, preferably a good electrical conductor, surrounding the measuring device 16 and having fluid passages formed therethrough for guiding the flow of fluid from a fluid inlet 22 to a fluid outlet 24 through the measuring device 16. Electrically conductive housing 20, as will more fully hereinafter appear forms a shield for the magnetic drive against the interference of high frequency magnetic fields.

Meter casing 20 is formed with a partition 26 intermediate the inlet 22 and the outlet 24 which is formed with an opening 28 therethrough. Measuring device 16, which, externally, is generally cylindrical in form, is supported within the meter casing substantially in coaxial alignment with the opening 28, a sealing ring 30 being interposed between the upper peripheral edge 32 of the measuring device 16 and the adjacent surface of the partition 26 surrounding the opening 28. The bottom peripheral edge 34 of the measuring device 16 rests upon a pliable rubber O-ring 36 formed integrally with a pliable rubber frost plate liner 38. The structure and function of this frost plate liner is disclosed in detail and claimed in application Serial No. 265,844 filed January 10, 1952, by Ernest H. Treff and Robert Z. Hague and now abandoned.

Figure 1:
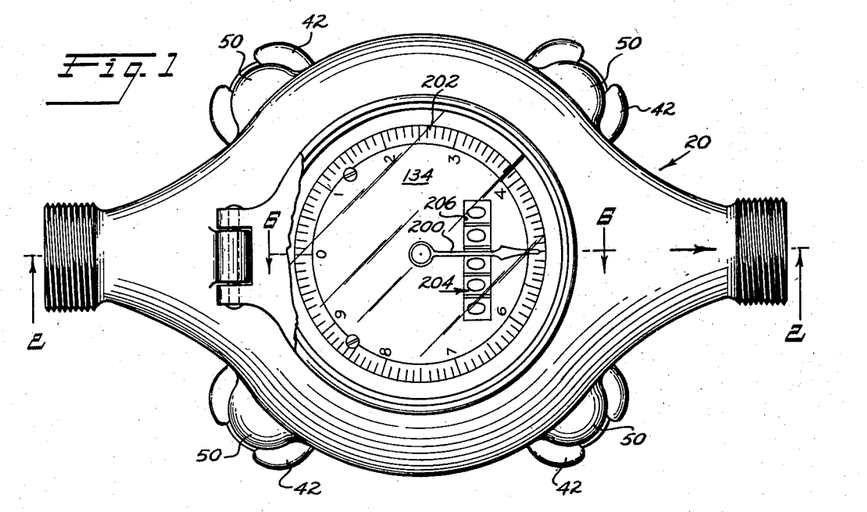
Figure 1 is a plan view of a preferred meter assembly embodying our invention.

A bottom plate 40, which may be a cast iron frangible frost plate formed with a plurality of spaced, integral, bifurcated lugs 42, is provided with an upturned annular rim portion 44 which engages the O-ring 36 along its chamfered edge 45 to form a sealed closure for the bottom access opening 46 of the meter casing 20. Plate 40 is fixed in position on the bottom of the meter casing 20 by a plurality of machine screws 48 passing through lugs 42 and threadedly engaged with apertures formed to the bottom of the outwardly extending portions 50 of the meter casing 20 which are best shown in Figure 1.

Fluid flow measuring device

Figures 3, 4, 5:
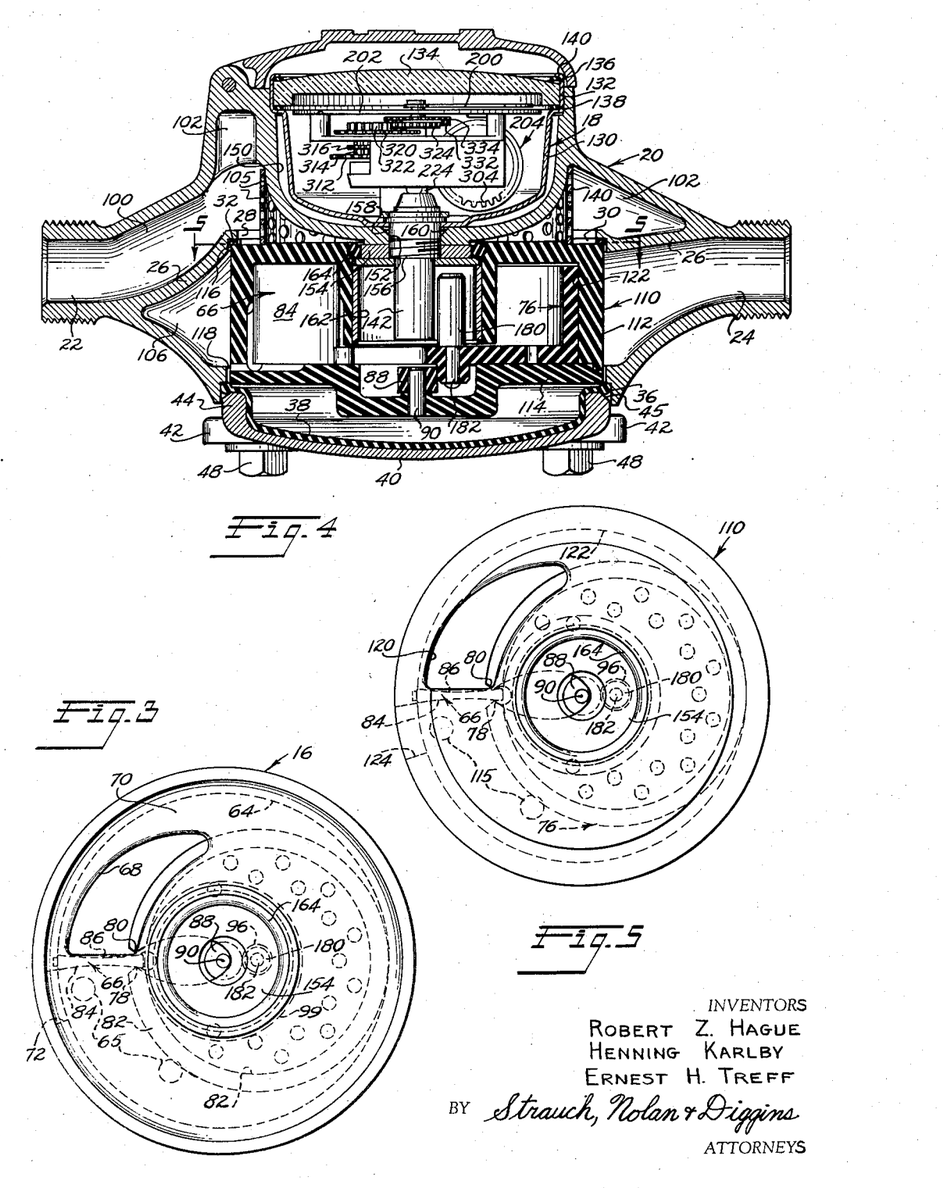
Figure 3 is a horizontal sectional view constituting a plan view of the measuring chamber assembly of the meter assembly taken substantially along the line 3—3 of Figure 2.
Figure 4 is the vertical sectional view through a meter assembly similar to that of Figures 1 to 2 but which includes a hard rubber measuring chamber.
Figure 5 is a sectional view taken substantially along the line 5—5 of Figure 4 constituting a plan view of the hard rubber measuring chamber.

The fluid flow measuring device 16 is preferably of the disclosed oscillating piston type best shown in Figures 2 and 3. This device consists of a pair of mating housing members 60 and 62 defining therebetween a hollow, generally cylindrical measuring chamber 64. In this embodiment, members 60 and 62 are formed of a material having the same coefficient of expansion as meter casing 20. Pressure equalizing holes 65 are provided in member 62 to prevent pressure loading of the bottom plate. Flow division member 66 is supported radially within the chamber 64 intermediate inlet port 68 formed in the top wall 70 of housing member 60 and outlet port 72 formed through cylindrical wall 74 of the housing member 60. Slotted piston 76 straddles flow division member 66 and is guided for oscillatory movement within the chamber.

The movement of piston 76 is guided by engagement of the edges 78 and 80 of the slot formed through rim portion 82 of piston 76 with formed surfaces 84 and 86 respectively of the pliable rubber covered flow division member 66. Flow division member 66 is constructed in accordance with the principles set forth in application Serial No. 226,836 filed May 17, 1951, by Patrick J. Rochford and Robert Z. Hague for meter, which matured into Patent Number 2,735,408 on Feb. 21, 1956, to which reference is made if further details are needed for a complete understanding of the present invention.

Piston guide roller 88 is journalled on stub shaft 90 fixed in sealed relation through an aperture 92 in the bottom wall of a depressed portion 94 of bottom housing member 62 coaxial with the chamber 64. Movement of piston 76 is also guided by coaction of guide roller 88 with cylindrical boss 96 depending from the bottom of the web portion 98 of the piston 76 coaxial therewith. Flow of liquid through chamber 64 from inlet port 68 to outlet port 72 produces oscillating movement of piston 76 in conventional manner, boss 96 thereof moving in a circular path about guide roller 88. Upper casing member 60 is formed with central guide ring 99 depending from the interior surface of top wall 70 in coaxial alignment with the chamber 64.

Fluid to be metered, enters meter casing 20 through inlet 22, flows through channel 100 into annular chamber 102 defined by the walls of meter housing 20 and the surface of top wall 70 of the casing member 60. A thin walled cylindrical member 104, having a plurality of apertures 105 formed therethrough, rests upon top wall 70 of casing member 60 and forms a screen to prevent entrance of foreign material into measuring device 16. Fluid to be measured flows from the chamber 102 into measuring chamber 64 through apertures 105 and inlet port 68, and is exhausted from measuring device 16 through outlet port 72 into chamber 106 surrounding device 16, defined by cylindrical wall 74 of casing member 60 and the internal wall of the meter housing 20 between sealing element 30 and the O-ring 36. Outlet 24 of casing 20 opens directly into chamber 106 surrounding the device 16 so that fluid exhausted from device 16 through outlet port 72 flows around the sides of device 16 and through outlet port 24.

Fluid flow measuring device (hard rubber casing)

As previously indicated, for certain fluid meter applications, it is desirable for minimum production cost, maximum corrosion resistance, and conservation of critical materials, to construct the measuring chamber as well as the oscillating piston of hard rubber. The improved structural arrangement of the meter housing 20 and of the fluid sealing elements of the meter of our invention permit this. While this embodiment is described as having both the measuring chamber and piston formed of hard rubber it will be understood that the measuring chamber may be constructed of metal and only the piston formed of hard rubber.

A meter assembly, in accordance with the present invention, in which hard rubber is utilized for the measuring chamber defining members is shown in Figures 4 and 5. In those figures, a modified fluid flow measuring device 110 is shown which differs from the measuring device 16 of Figure 2 in that upper housing member 112 and lower housing member 114 are formed of hard rubber. Pressure equalizing holes 115 are provided in member 114. Fluid measuring device 110 is held in position within meter casing 20 in sealed relation therewith at its upper and lower peripheral edges by engagement with the gasket 30 and O-ring portion 36 of liner 38 as in the previous embodiment. Due to the clearances 116 and 118 between the cylindrical wall of the measuring chamber and the meter housing, members 112 and 114 can expand radially without engagement with housing 20 and due to the pliable nature of the gasket 30 and the O-ring portion 36 of plate liner 38, members 112 and 114 can expand axially without increasing the loading applied thereto sufficiently to break either member 112 or member 114. Since the O-ring portion 36 of liner 38 is extremely flexible, a fluid seal is maintained throughout a wide range of dimensional changes due to temperature and pressure variations. This permits the use of lighter weight housing structure with substantial savings in weight of critical materials and costs.

The mode of operation of measuring device 110 is exactly the same as that of measuring device 16 with the above-noted exceptions and all other parts of the meter shown in Figure 4 are identical with that shown in Figure 2 so that the two forms of measuring chamber defining members may be used interchangeably, a highly important practical feature in standardization of parts for use in various types of meters.

Interrelated fluid flow measuring device and fluid flow registering device

Figures 6, 7:
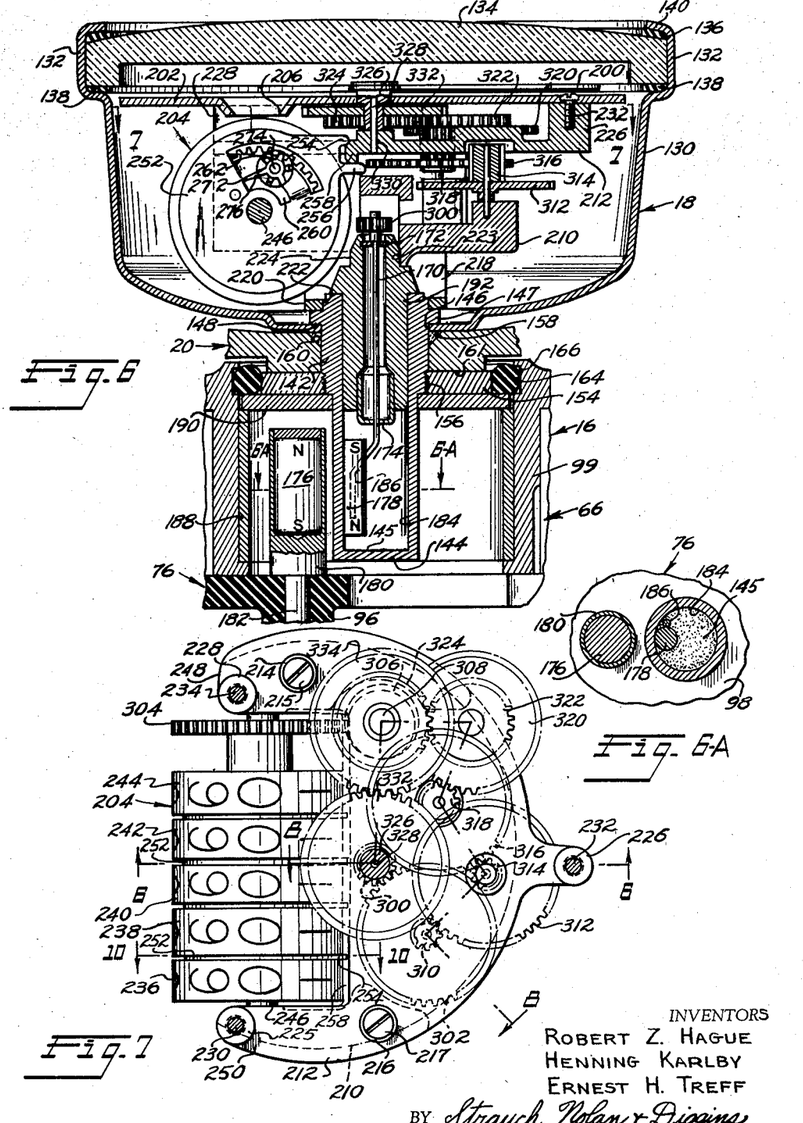
Figure 6 is an enlarged sectional view of the register assembly and magnetic drive taken substantially along the lines 6—6 of Figures 1 and 7.
Figure 7 is a horizontal sectional view of the register assembly taken substantially along the line 7—7 of Figure 6.

Magnetic coupling by which the fluid flow measuring device 16 is operably connected to fluid flow registering device 18 is shown in detail in Figure 6. Register assembly 18 is, as is best shown in Figure 6, sealed, being provided with a generally cup-shaped casing 130 formed of non-corroding material having a radially enlarged portion 132 in which a transparent window glass 134 is received. Window 134 is held in sealed relation to enlarged portion 132 of casing 130 between annular gaskets 136 and 138, the top peripheral edge 140 of housing 130 being spun over the gasket 136 to complete the assembly of register 18 and form a permanently sealed unit into which neither dirt nor moisture can enter and which cannot be disassembled without destruction of case 130. Tampering with register mechanism 18 by unauthorized persons is thus prevented. Member 142, of generally tubular construction having integral bottom 144 having an upper braking surface 145 extends through aperture 146 formed coaxially in the bottom of cup-shaped casing 130 and is provided with radially extending flange portion 147 in axial abutment with the interior surface of the casing 130 around aperture 146. Member 142 is fixed in sealed relation with the casing 130 along the abutting surfaces at 148 as by brazing.

As is best shown in Figure 2, sealed unit 18 is received within cup-shaped recess 150 formed in the top wall of meter housing 20, an aperture 152 being formed through the wall at the bottom of recess 150 through which tubular member 142 extends. Register assembly 18 is secured in position within recess 150 by locking disk 154, threadedly engaged with the tubular member 142 as indicated at 156 internally of the housing 20. Sealing element 158 surrounds tubular member 142 in abutment with the adjacent external surface of casing 130 and is received within countersink 160 around aperture 152. When disk 154 is tightened on the tubular member 142 against internal surface 161 of cup-shaped wall portion of housing 20, sealing element 158 is compressed to form a fixed fluid seal preventing passage of fluid through the housing wall via aperture 152.

Tubular member 142 extends substantially coaxially into cylindrical chamber 162 defined internally of guide ring 99. O-ring 164 is received within an annular cylindrical recess 166 formed in upper casing member 60 coaxial with guide ring 99. O-ring 164, in the final meter assembly, surrounds the cylindrical periphery of disk 154 so that it and O-ring 164 define a pair of coacting piloting surfaces maintaining accurate alignment between measuring device 16 and register 18. By this construction proper alignment of the fluid measuring device 16 and register assembly 18 is maintained independent of the structure of housing 20, thus producing an assembly which may be more economically manufactured and which may be more readily assembled and disassembled.

Magnetic register drive

As shown in Figure 6, an improved magnetic coupling is provided between oscillating piston 76 and input spindle 170 of the register 18. Register mechanism drive spindle 170 of minimum diameter (for example of the order of .020) is journalled for rotation in a pair of plain bearing members 172 preferably of magnetic material, and 174 which must be of non-magnetic material. The drive coupling from piston 76 to spindle 170 is produced by magnetic attraction between magnetically coupled members 176 and 178, at least one of which, but preferably both of which, are permanent magnets. Member 176 is mounted coaxially of the piston 76 by casing 180 formed of non-magnetic material and having stem 182 extending through the boss 96 to form a reinforcement therefor. Driven member 178 is in the form of a cylindrical roller which is disposed within tubular member 142 and normally held in engagement with cylindrical side wall 184 thereof above the surface of end wall 144 by the magnetic attraction to driving member 176. Oscillation of piston 76 will cause the driving member 176 to move in a substantially circular path about the axis of tubular member 142. Due to magnetic attraction between members 176 and 178, driven member 178 is caused to roll in a path along cylindrical surface 184 as driving member 176 moves in its path. The lower end of spindle 170 is extended and formed into an outwardly turned crank-like portion 186 lying in the path of and driven by movement of member 178. Member 178 is completely free of axial restraint and is normally held by the magnetic attraction between the members 176 and 178 in a position above braking surface 145 of tubular member 142.

Since there is no axial restraint upon the driven member 178 by the lower portion 186 of the spindle 170, if for any reason the driving and driven members should become separated, driven member 178 will drop under the influence of gravity into frictional engagement with surface 145. Frictional engagement of the driven member 178 with the braking surface 145 is sufficient to prevent movement of the driven member toward the driving member as the driving member approaches the driven member. The driven member will therefore remain at rest upon braking surface 145 until the driving member comes to a position adjacent the driven member. At that time, the driven member will be lifted from surface 145 to the position shown in Figure 6, where the drive will be reestablished. This elimination of the effect of the negative impulse, or movement of the driven member toward the driving member, as the driving member approaches the driven member not only permits pick up of the driven member at much higher passing velocities, but in effect prevents separation in practical operation.

The disabling of magnetic attraction between members 176 and 178 by the external application of a strong high frequency alternating magnetic field to the meter is prevented by magneto-dynamic barrier of eddy currents formed in the electrically conductive outer housing 20 which envelops the magnetic drive. The paths of movement of driving and driven members 176 and 178 are also protected from externally applied steady or low frequency magnetic fields by a magneto-static shield formed by a cylinder 188 formed of magnetic material having a high permeability, an upper apertured circular plate 190 which fits loosely into 99, and insert 192 in tubular member 142 both of which are formed of similar magnetic material. Insert 192 serves as a support for bearings 172 and 174. Members 188, 190, and 192 thus shield the paths of movement of the members 176 and 178 by providing a low reluctance path diverting externally applied low frequency or steady state magnetic disturbances from members 176 and 178. An air gap exists at the bottom of cylinder 188 due to the necessity for an opening to permit movement of the support 180 for the driving member 176, and an annular gap in the magnetic path exists intermediate the aperture of plate 190 and insert 192 equal to the thickness of the wall of member 142. These discontinuities in the steady or low frequency magnetic fields shield have been found to have no substantial effect on the magnetic shielding.

Register mechanism drive train

Figure 8:
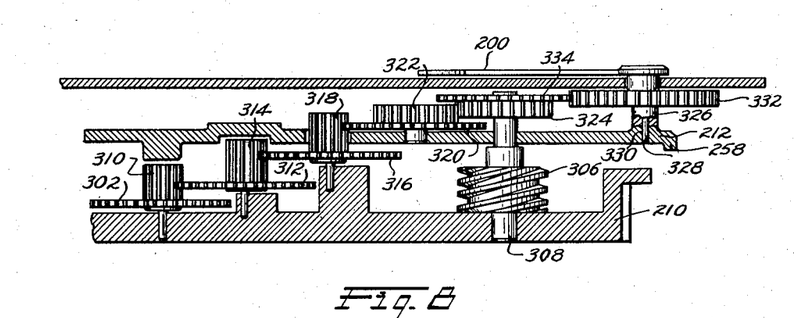
Figure 8 is an irregular section taken along the line 8—8 of Figure 7 showing the interaction of the members of the gear train of the register assembly.
Figure 9:
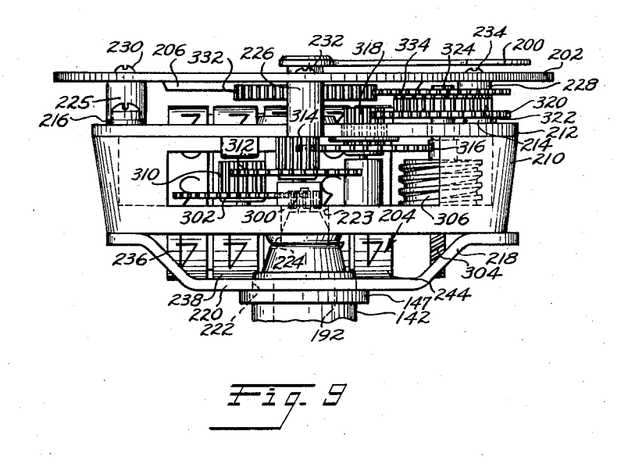
Figure 9 is an end view of the register mechanism shown in Figure 7.

As is shown in Figure 1, the total quantity of fluid passing through the meter is indicated by pointer 200 pivotally mounted centrally of an indicator dial 202 and a plural order counter mechanism 204, a portion of which is visible through a window 206 formed through the indicator dial 202. The register assembly is a compact unit more fully disclosed in an application, serial number 276,652, executed on even date herewith for Improvements in Meter Registers and Drive Mechanisms. This unit is formed of light weight instrument type parts having low friction and inertia and is a sealed unit so that the corrosive atmosphere to which meters of this type are subjected, will not affect the accuracy, dependability, and life of the unit, and is best shown in Figures 7, 8 and 9. Counter mechanism 204 and the various gears of the drive train from register drive spindle 170 are supported upon a pair of die-cast members 210 and 212, each having the general shape of a yoke as shown in Figure 7 and which are swaged together at 214 and 216. Bracket 218 (Fig. 9), having a central depressed portion 220 is secured to the bottom of member 210 by means of screws 215 and 217 (Figure 7) which extend freely through members 210 and 212 and which are threadedly engaged with aligned tapped holes in bracket 218 at their ends. Aperture 222 is formed centrally through the depressed portion 220 of bracket 218, which, as shown in Figure 6, in assembly, surrounds the upper end portion of tubular member 142. The surrounding bottom surface of the depressed portion 220 rests upon and is fastened to flange 147. The register mechanism is accurately positioned in coaxial alignment to drive spindle 170 by the piloting relation of aperture 223 (Fig. 9) of die cast member 210, and a piloting extension 224 of insert 192 coaxial with upper bearing 172 (Fig. 6).

Dial plate 202, as is best shown in Figures 6 and 9, is supported in parallel spaced relation with the top surface of the member 212, by three spaced bosses 225, 226 and 228 which are conveniently formed integral with the member 212. Plate 202 is secured to these bosses by screws 230, 232, and 234 which are respectively threadedly engaged therewith.

Counter mechanism 204 is of generally conventional design, being generally of the intermediate pinion carry mechanism type similar to that disclosed in United States Letters Patent No. 1,909,740 issued May 16, 1933 to Zubaty. This mechanism comprises a plurality of counter wheels 236, 238, 240, 242 and 244, the last four of which are journalled for rotation upon a shaft 246 and the first of which is fixed thereon. These wheels represent, respectively, the units, tens, hundreds, thousands, and ten thousands orders of the counter. Shaft 246 is journalled for rotation between the arms 248 and 250 of the yoke shaped member 210.

Figure 10:
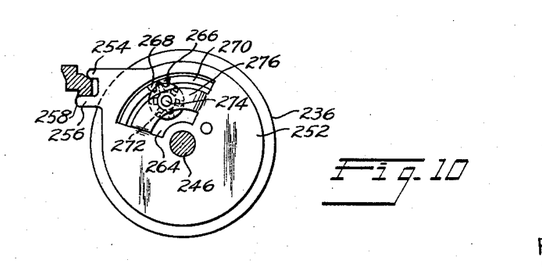
Figure 10 is a vertical section through the counter assembly taken along the line 10—10 of Figure 7.

A carry pinion support plate 252, as shown in Figure 6, is mounted intermediate each pair of counter wheels and each is provided with a pair of ears 254 and 256 which embrace a ledge 258 formed integral with the member 212 and extending parallel to the axis of the shaft 246. The engagement of ears 254 and 256 with ledge 258 prevents rotative movement of the support plates 252 about the shaft 246. The face of each counter wheel adjacent the next lower order counter wheel is provided with recess 260 around the peripheral edge of which is formed a continuous row of internal annular teeth 262 coaxial with shaft 246. As is shown in Figure 10, each counter wheel face adjacent the next higher order is provided with a recess 264 on the peripheral edge of which is formed a pair of adjacent gear teeth 266 and 268 and a peripheral ledge 270 coaxial with shaft 246 and which is axially shorter than the length of gear teeth 266 and 268. Carry pinion 272 is journalled upon stub shaft 274 which is fixed to off-set portion 276 of support plate 252. The teeth of pinion 272 are in constant mesh with the row of teeth 262 on the counter wheel of the next higher order and are of such formation that they coact with the pair of teeth 266 and 268 and the ledge 270 of the next order counter wheel in the manner of a Geneva movement.

In the particular embodiment disclosed, a complete revolution of a lower order counter wheel will advance the pinion 272 two teeth which, in turn, will advance the associated counter wheel by one unit or a tenth of a revolution by the advancement of the internal annular gear teeth 262 by two teeth. The teeth of pinion 272 coact with the ledge 270 to prevent movement of the pinion 272 of the adjacent higher order counter wheel except at the time when the teeth 266 and 268 engaged the teeth of the pinion 272. The count of the counter mechanism 204 is advanced by rotation of the shaft 246 to which the lowest order counter wheel 236 is fixed. Thus 10,000 revolutions of the shaft 246 will produce 10,000 revolutions of the counter wheel 236, 1,000 revolutions of the counter wheel 238, 100 revolutions of the counter wheel 240, 10 revolutions of the counter wheel 242, and one revolution of the counter wheel 244. Reference is made to the aforesaid Zubaty patent for a more detailed explanation of the mode of operating of counter mechanisms of this type if such is found to be necessary.

Counter mechanism 204 is driven from spindle 170 by a gear train formed of small light weight gears having low inertia and which requires a minimum of driving torque. A pinion 300, shown in Figures 6 and 9, is fixed to the upper end of register drive spindle 170 and is in constant mesh with a gear 302. Input shaft 246 of counter mechanism 204 is driven by a worm wheel 304 fixed thereto which is in constant mesh with a worm 306. The worm 306 is fixed to a shaft 308 which is supported by and journalled in the members 210 and 212, as is best shown in Figure 8. Shaft 308 is driven from gear 302, with which the pinion 300 on the register drive spindle is in constant mesh, by a reduction gear train consisting of a pinion 310 fixed to gear 302, gear 312 in constant mesh with pinion 310, pinion 314 fixed to gear 312, a gear 316 in constant mesh with pinion 314, pinion 318 fixed to gear 316, a gear 320 in constant mesh with pinion 318, and a pair of meshed gears 322 and 324 fixed respectively to gear 320 and to shaft 308. Thus, upon rotation of spindle 170, counter 204 is advanced through the action of this drive train.

As shown in Figure 6, indicator arm 200 which has a hub 326 fixed thereto is rotatably mounted upon a short shaft 328, which is fixed within aperture 330 formed in member 212. Below plate 202, gear 332 is fixed to the hub 326. By this construction, plate 202, indicator arm 200, and gear 332 are removable as a sub-assembly after removal of the screws 230, 232 and 234. As shown in Figure 8, gear 332 is in constant mesh with a gear 334 which is fixed to the gear 324 and to the shaft 308 so that indicator arm 200 is caused to rotate about the axis of shaft 328 in timed relation with the drive of the counter mechanism 204. As will be noted, with the exception of shaft 308, the gears of this drive train are journalled on but one of the members 210 and 212. This arrangement results in economy of manufacture, ease of assembly, and low overall friction of the gear train.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a fluid meter, a fluid flow measuring device, a housing surrounding said measuring device having an inlet, an outlet, and fluid passages for directing fluid along a path from said inlet to said outlet through said measuring device; a fluid flow registering device secured to the exterior of said housing and comprising a sealed register casing structurally independent of said housing and including a sealed well depending therefrom and extending into said measuring device through an aperture in the wall of said housing, said well having a cylindrical interior surface, a registering mechanism mounted within said register casing above said well, a spindle journalled for rotation within said well and coupled to said registering mechanism, a roller member within said well adapted to move in a circular path upon said cylindrical surface and drivingly engage said spindle; said fluid measuring device including a fluid flow driven member adapted to move in a circular path about the axis of said cylindrical surface at a rate proportional to the rate of flow of fluid through said measuring device; at least one of said members being a permanent magnet and the other being attracted thereto; means for maintaining coaxial alignment of said devices independently of said housing and said fluid flow driven member including a pair of mating piloting surfaces one fixed relative to each of said devices, and fluid sealing means for preventing passage of fluid through said housing along channels other than said path through said measuring device, said housing being of such construction and said sealing means being so interposed between said devices and said housing that at least one of said devices is free of rigid restraint by said housing and said sealing means.

2. A fluid flow meter comprising a generally hollow meter assembly housing including a top wall having a substantially cup-shaped externally depressed portion having a centrally located aperture in the bottom thereof, a flow measuring device including a generally cylindrical casing therefor formed with a first opening in one end face thereof and a second opening in the cylindrical wall thereof, one of said openings being an inlet port and the other an outlet port for said measuring device, a member guided for cyclical movement within said casing in response to fluid flow therethrough, said casing being mounted in said housing in generally coaxial alignment and with its said one end face adjacent said cup-shaped depressed portion, an annular sealing element axially interposed between the peripheral edges of said one end face of said casing and a sealing element receiving face on the adjacent wall of said housing in spaced relation from said cup shaped depressed portion, means resiliently biasing said casing against said annular sealing element to form a continuous fluid tight seal between said housing and casing at said peripheral edge, a register mechanism mounted within the cup formed by said cup-shaped depression, a tubular member extending coaxially through the aperture in the bottom of said cup-shaped depression into said measuring device casing in fluid tight relation with said housing and with said one end face of said measuring device, a driving element for said register mechanism having one end operatively connected to said register mechanism and its other end extending within said tubular member and a drive coupling operatively interconnecting said fluid flow responsive member and said register driving element, a portion of the interior wall of said housing and said end face of said casing defining a first chamber surrounding a portion of said registering mechanism on one side of said sealing element, the portion of the wall of said housing on the opposite side of said sealing element being so shaped as to cooperate with said casing and sealing element as to define a second chamber surrounding said casing, and said housing being formed with an inlet port opening into one of said chambers and an outlet port opening into the other of said chambers.

3. In a fluid meter, a meter housing, a fluid powered motor including a casing therefor, said motor being mounted within said meter housing with substantial radial clearance between the motor casing and the meter housing, a flexible fluid seal interposed axially of said motor casing intermediate the peripheral edge of an end face of said motor casing and the adjacent interior surface of said meter housing, means comprising an annular resilient fluid sealing member interposed axially of said motor casing intermediate the peripheral edge of the opposite end face of said motor casing and the adjacent portion of the interior surface of said meter housing for axially resiliently biasing said motor casing against said seal to form a fluid tight seal between said housing and motor casing at said peripheral edges, said housing being so formed as to define a first annular fluid chamber in axially spaced relation to said motor casing on one side of the first said seal, a second annular fluid chamber surrounding said motor casing intermediate said seals, and first and second fluid ports opening into said first and second annular fluid chambers respectively, said motor casing having a fluid inlet port opening in the one of said chambers and a fluid exhaust port opening into the other of said chambers.

4. In a fluid meter, a fluid flow measuring device consisting of a casing defining a fluid measuring chamber and spaced inlet and outlet ports opening thereinto, one of said ports being formed through an end wall of said casing and the other through the side wall thereof, a flow division member mounted in said casing intermediate said ports, a slotted fluid driven member straddling said flow division member and guided for movement within said chamber in response to fluid flow therethrough; housing structure enveloping and mounting therewithin said measuring device with substantial radial clearance between said casing and said housing structure; means defining a continuous, flexible fluid seal interposed between said housing structure and said end wall of said casing axially of said casing; means including an annular resilient sealing means compressed against said measuring chamber casing for holding said casing firmly against the first said seal defining means without producing radial restraint on said casing; said housing structure being so formed as to cooperate with said seal defining means and said casing to define a second fluid chamber surrounding said casing intermediate said seal defining means and a third fluid chamber on the opposite side of said seal defining means in axially spaced relation with said casing, said housing structure having a fluid inlet opening into one of said latter two fluid chambers and a fluid outlet opening into the other, and said one casing port opening into said third chamber and said other port opening into said second chamber.

5. A fluid metering device as defined in claim 4 wherein said casing and said fluid driven member are formed of material having substantially the same coefficient of thermal expansion.

6. A fluid metering device as defined in claim 5 wherein said casing and said fluid driven member are both formed of hard rubber.

7. A fluid metering device as defined in claim 4 wherein said casing and said housing structure are both formed of material having the same coefficient of expansion and said fluid driven member is formed of hard rubber.

8. In a fluid meter, a fluid measuring device, a housing enveloping said measuring device having an inlet, an outlet and fluid passages formed therein for directing fluid along a path from said inlet to said outlet through said measuring device; a flow registering device mounted exteriorly on said housing and coupled to said measuring device through a wall of said housing, said registering device having a casing structurally independent of said housing, locking means within said housing for securing said registering device casing to said housing, means including said locking means for maintaining coaxial alignment between said devices independently of said housing, and fluid sealing means for preventing passage of fluid through said housing along channels other than said path through said measuring device, said flow measuring device and said registering device being so coupled and said housing being of such construction and said sealing means being so interposed between devices and said housing that at least one of said devices is free of rigid restraint by said housing and said sealing means.

9. In a fluid meter, a generally hollow meter housing having formed therein a fluid inlet chamber and port, a fluid outlet chamber and port, and a partition having an opening therethrough separating said chambers; a fluid flow measuring device mounted in said housing in substantially coaxial alignment with said partition opening; a continuous fluid sealing element axially interposed between the adjacent surfaces of said partition and said measuring device around said opening; said meter housing and said measuring device having apertures formed through the exterior walls thereof in substantially coaxial alignment with said opening; a registering device having a casing structurally independent of said housing and including a tubular extension depending therefrom into said measuring device through said apertures in sealed relation therewith, a register mechanism drive spindle journalled for rotation within said tubular extension, means for preventing passage of fluid through said tubular extension along the spindle, coupling means drivingly interconnecting said measuring device and said spindle, lock means within said housing engaging said tubular extension for securing said register in position relative to said housing; said measuring device and said tubular extension each having one of a pair of mating piloting surfaces fixed relative thereto whereby coaxial alignment of said devices is maintained independently of housing.

10. A fluid meter comprising, in combination, a fluid measuring device including a casing, a housing enveloping said measuring device casing and having an inlet, an outlet and fluid passages formed therein for directing fluid along a path from said inlet to said outlet through said measuring device; a flow registering device provided with a casing structurally independent of said housing and the first said casing mounted exteriorly on said housing and having a portion extending in fluid tight relation into said measuring device through aligned apertures therein and in a wall of said housing, each of the casings of said devices having fixed relative thereto interiorally of said housing one of a pair of coacting piloting surfaces maintaining coaxial alignment between said devices independently of said housing, one of said coacting piloting surfaces being rigid and the other resilient to form a fluid tight seal with said rigid piloting surface, and fluid sealing means for preventing passage of fluid through said housing along channels other than said path through said measuring device, said housing being of such construction and said sealing means being so interposed between said devices and said housing that at least one of said devices is free of radial restraint by said housing and said sealing means.

11. A fluid meter comprising, in combination, a fluid measuring device, a casing therefor, a registering device coupled to said measuring device including an indicator and a gear train therefor, a casing enveloping said registering device, a support journalling said indicator and said gear train and mounted on said registering device casing, a pair of coacting piloting surfaces fixed respectively relative to each of said casings for maintaining coaxial alignment between said devices, a housing structurally independent of said casings enveloping said measuring device casing and having an inlet, an outlet, and fluid passages formed therethrough for directing fluid from said inlet to said outlet through said measuring device, and means defining fixed fluid seals between said casings and said housing for preventing passage of fluid along paths other than through said measuring device, said registering device and measuring device being so coupled and said housing being of such construction and said fluid seal defining means being so interposed between said casings and said housing that at least one of said casings is free of radial restraint.

12. A fluid meter comprising a generally hollow meter assembly housing having a top wall formed with a substantially cup-shaped external depression, a flow measuring device including a casing mounted within said housing below in substantially coaxial alignment with said cup-shaped depression and a fluid metering element mounted for movement within said casing in accordance with the fluid flow through said casing, a register mechanism assembly provided with a sealed casing structurally independent of said housing mounted within said depression and having a portion enclosing a register driving element extending in sealed relation coaxially through the depression of the housing wall into said measuring device casing, coupling means within said casings drivingly interconnecting said register mechanism driving element and said fluid metering element without radial restraint on said casings and fluid metering element, and means in said housing below said depression for locking said sealed register mechanism in position within said depression so that said register mechanism can be removed only by manipulation of said locking means within the housing.

13. In a fluid meter, a housing having an internal chamber adapted to be traversed by fluid and having inlet and outlet connections to said chamber, said housing being open at its lower end and having its upper end closed by an integral cup shaped wall that extends down into said chamber, means defining an annular shoulder around the wall of said chamber intermediate said inlet and outlet connections near the bottom of said cup-shaped wall, a fluid flow measuring device seated on said shoulder within said chamber to confine fluid flow between said inlet and outlet connections to a path through said measuring device, means for closing the lower end of said housing and holding said device seated on said shoulder, said device having fluid inlet and outlet ports and an element moved by fluid flow therethrough, a register mechanism, a fluid tight casing containing said register mechanism, said casing being seated and wholly received within said cup-shaped wall and having a tubular portion projecting through aligned apertures in the said cup-shaped wall and the top of said device, means securing said casing to said wall, and coacting magnetically coupled means within said tubular portion and on said element for driving said register from said element.

14. In a fluid meter, a fluid measuring device consisting of a casing defining a fluid measuring chamber and having spaced inlet and outlet ports formed therein, one formed through an end wall of said casing, the other through the side wall thereof, and a fluid metering element mounted for movement within said fluid measuring chamber in accordance with the flow of fluid between said ports; housing structure enveloping and mounting said measuring device therewithin with substantial radial clearance between said casing and said housing structure; means defining a continuous flexible fluid seal interposed between said housing structure and said casing axially of said casing at said end wall; and means within said housing comprising an annular resilient fluid sealing member interposed axially of said measuring chamber intermediate the peripheral edge of the opposite end face of said measuring chamber and the adjacent portion of the interior surface of said meter housing structure for resiliently biasing said casing against said flexible fluid seal means, said housing structure being of such shape as to define in cooperation with said casing a first annular fluid chamber surrounding said casing intermediate said flexible fluid seal means and said fluid sealing member and a second annular fluid chamber in axially spaced relation to said first annular fluid chamber; said housing structure having a fluid inlet opening into one of said annular fluid chambers and a fluid outlet opening into the other; and one of said ports of said casing opening into said first chamber and said other casing portion opening into said second chamber.

15. A fluid meter comprising a fluid measuring device having an output member forming one element of a magnetic coupling; a housing enveloping said measuring device and having an inlet, an outlet and fluid passages therethrough for directing fluid along a path from said inlet to said outlet through said measuring device; a registering device subassembly, said subassembly being encased within an air tight casing structurally independent of said housing having a portion which extends in fluid tight relation into said measuring device through aligned apertures therein and in a wall of said housing, said subassembly comprising an input member disposed within said registering device casing portion magnetically coupled to said output member, and an indicator and a drive train interconnecting said input member and indicator, means maintaining substantially coaxial alignment between said measuring device and said subassembly casing independently of said housing, and fluid sealing means for preventing passage of fluid along channels other than said path through said measuring device, said housing being of such construction and said sealing means being so interposed between said devices and said housing that at least one of said devices is free of rigid restraint by said housing and said sealing means.

16. A fluid meter comprising a measuring chamber device having an output member mounted for movement in a circular path therein, a hollow support piloted in said chamber substantially coaxial with the path of movement of said output member, a fluid flow indicator and drive train therefor mounted on said support, a spindle journalled within said hollow support and drive connected at one end to the output member of said measuring chamber and at the other end to said indicator drive train, a casing mounted on said hollow support and enveloping said indicator and drive train, a housing enveloping said measuring chamber without radial restraint thereon and provided with an inlet and an outlet and fluid passages therein to confine fluid flow between said inlet and said outlet to a path through said measuring chamber, and means securing said tubular support to said housing.

17. An axially compact fluid meter comprising, in combination, a generally cylindrical fluid flow measuring device having an inlet port in one end wall thereof and an outlet port in the peripheral wall thereof; a registering device coaxially aligned therewith, means operatively interconnecting said devices; a housing casting formed with a concavity in the exterior thereof receiving said registering device and said housing enveloping said fluid flow measuring device and formed with an annular inlet chamber surrounding the concavity adjacent said measuring device in axially spaced relation to said flow measuring device one end wall and bounded in part thereby, an outlet chamber surrounding said flow measuring device peripheral wall, and inlet and outlet passages interconnecting with the respective ones of said chambers; and a cylindrical screen mounted within said inlet chamber about the portion of said housing casting forming said concavity and in abutment with said housing casting portion at one end and with said measuring device end wall at the other end, said screen being interposed between said inlet passage and said measuring device inlet port to prevent entry of solid matter into said measuring device.

18. In a fluid meter, a generally hollow housing having an inlet and an outlet separated internally of the housing by an apertured partition, said housing having an access opening through the external wall thereof opposite the aperture of said partition, a measuring chamber received within said housing through said access opening with substantial radial clearance so that said measuring chamber is free of radial restraint by said housing, a continuous flexible sealing element axially interposed between the periphery of the aperture of said partition and said end face of said measuring chamber, a cover for said access opening, means forming a seal between said cover and said housing about said access opening, and means resiliently biasing said measuring chamber against said sealing element whereby the interior of said housing is divided by said partition and measuring chamber into axially juxtaposed sealed fluid inlet and outlet chambers interconnected therethrough.

19. In a fluid meter, a generally hollow housing, a measuring chamber assembly within said housing, a register and register drive train assembly located exteriorly of said housing, a hollow support extending through aligned apertures in adjacent walls of said housing and measuring chamber in fluid tight relation, said support being rigidly connected to said housing at the aperture thereof and supporting said register and drive train assembly, means extending through said support drive connecting said measuring chamber assembly and said drive train, coacting piloting means on said support and on said measuring chamber assembly maintaining coaxial alignment of said register assembly and said measuring chamber assembly independently of said housing, and means forming fluid tight seals between said register assembly, measuring chamber assembly, and housing without radial restraint of at least one of said assemblies relative to said housing.

20. In a fluid meter, a measuring chamber, a register, a magnetic drive coupling interconnecting said measuring chamber and said register and comprising a first member constituting the output member of said measuring chamber and a second member magnetically coupled to said first member and drive connected to said register, a housing structure enveloping said measuring chamber and provided with an inlet and an outlet and fluid passages therein confining fluid flow between said inlet and said outlet to a path through said measuring chamber, and an imperforate permanently sealed air tight casing access to the interior of which can be achieved only by destruction thereof and which is structurally independent of and independently separable from said housing which envelops said register and said second member of said magnetic drive coupling and which has a portion of non-magnetic material interposed between said members of said drive coupling.

21. In a fluid meter, a fluid flow measuring device, a housing surrounding said measuring device having an inlet, an outlet, and fluid passages for directing fluid along a path from said inlet to said outlet through said measuring device; a fluid flow registering device secured to the exterior of said housing and comprising an imperforate permanently sealed register casing access to the interior of which can be achieved only by destruction thereof and which is structurally independent of and independently separable from said housing and which includes a sealed well depending therefrom and extending into said measuring device through aligned apertures in the walls of said housing and measuring device, a registering mechanism mounted within said register casing above said well, a spindle journalled for rotation within said well and coupled to said registering mechanism, said fluid measuring device including a fluid flow driven member adapted to move at a rate proportional to the rate of fluid through said measuring device, and a magnetic coupling interconnecting said device and said mechanism comprising a driving member driven by said fluid flow driven member and a driven member within said sealed well magnetically coupled to said driving member and drive connected to said spindle, at least one of said members of said magnetic coupling being a permanent magnet and the other being attracted thereto.

22. In a fluid meter, a meter housing, a fluid powered motor including a casing therefor, said motor being mounted within said meter housing with substantial radial clearance between said motor casing and said meter housing, a flexible seal interposed axially of said motor casing intermediate the peripheral edge of an end face of said motor casing and the adjacent interior surface of said meter housing, means interposed axially of said motor casing intermediate the opposite end face of said motor casing and the adjacent portion of the interior surface of said meter housing for axially resiliently biasing said motor casing against said seal to form a fluid tight seal between said housing and motor casing at said peripheral edge, said housing being so formed as to define with the first said end face a first fluid chamber in axially spaced relation to said motor casing on one side of said seal, and with the peripheral wall of said motor casing a second fluid chamber surrounding said motor casing on the opposite side of said seal, and first and second fluid ports opening into said first and second fluid chambers respectively, said motor casing having a fluid inlet port opening into the one of said chambers and a fluid exhaust port opening into the other of said chambers.

23. For use in a fluid meter having a drive member of a magnetic coupling mounted for cyclical movement in response to fluid flow through the meter, a register mechanism subassembly embodying a permanently hermetically sealed casing access to the interior of which can be achieved only by destruction thereof, a driven member of such coupling disposed within said casing and adapted to be driven cyclically in response to movement of said drive member due to the magnetic coupling therebetween, and a register disposed within said casing and drive coupled to said driven member.

24. A factory sealed fluid tight meter register subassembly comprising an imperforate thin walled metal shell providing a concavity, a transparent wall extending across the open end of and closing said concavity, means including gasket means and portions of said shell disposed on opposite sides of the periphery of said wall so fixing said wall in fluid tight relation to said shell that said shell and wall can be separated only by deformation or destruction of said shell or said wall, a hollow and closed end outwardly projecting non-magnetic extension fixed in permanently sealed fluid tight relation to said shell and providing an extension of said concavity, a magnetic member disposed in said shell extension and operable to form one element of a magnetic drive coupling in cooperation with a drawing magnetic member moved about the exterior of said shell extension, and a register disposed within said concavity and including an indicator visible through said wall, and a drive connection from said magnetic member to said register.

(References on following page)

References Cited in the file of this patent

UNITED STATES PATENTS

| | | |
|---|---|---|
| 423,298 | Winton | Mar. 11, 1890 |
| 741,251 | Lambert | Oct. 13, 1903 |
| 783,518 | Gumz et al. | Feb. 28, 1905 |
| 825,399 | Lambert | July 10, 1906 |
| 1,073,387 | Bassett | Sept. 16, 1913 |
| 1,834,025 | Granger | Dec. 1, 1931 |
| 1,973,670 | Star | Sept. 11, 1934 |
| 2,008,500 | Hazard | July 16, 1935 |
| 2,258,183 | Humphreys | Oct. 7, 1941 |
| 2,354,563 | Weisse | July 25, 1944 |
| 2,399,856 | Coger | May 7, 1946 |
| 2,410,852 | Whittaker | Nov. 12, 1946 |
| 2,487,783 | Bergman | Nov. 15, 1949 |
| 2,566,220 | Lindley et al. | Aug. 28, 1951 |

FOREIGN PATENTS

| | | |
|---|---|---|
| 18,653/34 | Australia | Feb. 20, 1935 |
| 443,333 | Great Britain | Feb. 26, 1936 |
| 101,561 | Australia | July 8, 1937 |
| 708,386 | Germany | July 19, 1941 |
| 633,637 | Great Britain | Dec. 19, 1949 |

UNITED STATES PATENT OFFICE
CERTIFICATE OF CORRECTION

Patent No. 2,857,763                          October 28, 1958

Robert Z. Hague et al.

It is hereby certified that error appears in the above numbered patent requiring correction and that the said Letters Patent should read as corrected below.

Column 16, line 70, for "drawing" read -- driving --.

Signed and sealed this 12th day of September 1961.

(SEAL)
Attest:

ERNEST W. SWIDER                          DAVID L. LADD
Attesting Officer                             Commissioner of Patents
                                                                                      USCOMM-DC